US006077598A

United States Patent [19]

Harper

[11] Patent Number: 6,077,598

[45] **Date of Patent: *Jun. 20, 2000**

[54] POSTERBOARD AND METHOD OF REDUCING POSTERBOARD INVENTORY

[75] Inventor: Howard E. Harper, Redding, Conn.

[73] Assignee: Mafcote Industries, Inc., Norwalk, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,014

[22] Filed: Apr. 11, 1997

[51] Int. Cl.$^7$ .......... B32B 29/00

[52] U.S. Cl. .......... 428/220; 428/537.5; 40/611; 40/729

[58] Field of Search .......... 428/195, 204, 428/206, 537.5, 153, 172, 207, 908, 213, 211, 220; 283/74, 75, 91, 109; 40/617, 729, 611

[56] References Cited

U.S. PATENT DOCUMENTS 366,449 7/1887 Benjamin .

1,781,283 11/1930 Intemann .

4,391,833 7/1983 Self et al. .......... 426/523

5,470,301 11/1995 Brunt, II .......... 493/323

5,762,379 6/1998 Salmon et al. .......... 283/91

OTHER PUBLICATIONS

Miller's Office Products Catalog (Arlington, Virginia Crystal City Underground 703/413–5420), 1998.

Sample of a paper board or a matboard (pink color on one surface, white color on the opposite), unknow.

*Primary Examiner*—Deborah Jones
*Assistant Examiner*—Abraham Bahta
*Attorney, Agent, or Firm*—Ware, Fressola, Van Der Sluys & Adolphson LLP

[57] ABSTRACT

Posterboard has different colors on its two planar surfaces, whereby the posterboard may be selected for use on the basis of either or both colors. Groups of posterboard each having different colors on opposite planar surfaces provide for reducing inventory and shelf space while providing complete color selection to the purchaser.

10 Claims, 2 Drawing Sheets

POSTERBOARD AND METHOD OF REDUCING POSTERBOARD INVENTORY

FIELD OF THE INVENTION

The invention herein relates to improved posterboard and a method of reducing inventories of posterboard while preserving and enhancing customer selection of color.

BACKGROUND OF THE INVENTION

Heretofore, posterboard has been provided in one color. In some manufacturing processes, the color is provided by beater dyeing the paper slurry prior to forming and calendaring the posterboard. The color has also been provided by calendar dyeing the posterboard, which involves imparting the color at the same time the posterboard is calendared. Both of these processes result in posterboard which is of a single color.

The color of posterboard has also been printed or coated onto one side of white posterboard stock. This also results in a posterboard having a single color, white being used herein in its technical meaning of the absence of color. Thus, posterboard has been provided in a single color, and in some instances the single color appears on a single side of the posterboard with the opposite surface being white.

The one color posterboard has inherent limitations to both the customer/user and to the business providing the posterboard to the customer/user at the wholesale and retail levels. With respect to those wholesaling posterboard, they must stock all colors in sufficient quantities to fill orders from retailers. These businesses try to anticipate demand, so as to stock colors in amounts corresponding to future customer sales, but this can be difficult to accomplish in practice. A particular difficulty is created by seasonal colors, e.g., the color orange is popular for Halloween but generally sells in limited quantities for the remainder of the year.

The retailer also has concerns regarding shelf or display space. Each color of posterboard requires space for stocking and display, and the retailer will desirably stock and display enough of each color for possible customer demand. Therefore, the retailer needs to devote some space to colors which are less popular but which some customers nevertheless want, albeit in limited quantities, resulting in slow turnover of stock of those colors. This is a problem for retailers having limited space, and is also a problem for large retailers who prosper on low margins through highly efficient inventory control and use of display space.

Consumers often find an incomplete selection of colors of posterboard, or a lack of a reasonable quantity of posterboard in a selected color. Further, if the consumer intends to use the posterboard as stock material to cut out panels smaller than a full sheet or to cut out letters or other indicia from the posterboard material, the customer has to purchase one complete sheet of posterboard for each desired color.

Therefore, there is a need for an improved posterboard which provides more color selection to the consumer/user, and also provides a method of inventory reduction without compromising the consumer's selection of colors.

SUMMARY OF THE INVENTION

It is a principal object of the invention herein to provide an improved posterboard which enhances the customer/user's available color selections and purchasing efficiencies.

It is also an object of the invention herein to provide a method of reducing the inventories of posterboard while maintaining a color selection to the consumer/user.

In attaining the foregoing objects and features of the invention herein, there is provided a posterboard comprising a rectangular sheet of stock having a thickness of approximately 10 points or more with first and second planar surfaces. The first surface has a first color displayed thereon and the second surface has a second color displayed thereon, whereby the posterboard may be selected for purchase and use on the basis of either or both colors.

According to certain aspects of the invention, the color may be provided on the surfaces of the posterboard by coating or by printing. According to further aspects of the invention, posterboards are provided with fluorescent colors on the first and second surfaces thereof, and, alternatively, are provided with non-fluorescent colors on the first and second surfaces thereof.

The invention also resides in providing a plurality of posterboards for sale to consumers wherein each posterboard has two sides with a first color displayed on one side thereof and a second color displayed on the other side thereof. At least some of the plurality of posterboards display colors differently from others of the plurality of posterboards.

The invention further resides in a method of reducing inventory of posterboard including displaying a first color on one side of a posterboard and a second color on the other side of the posterboard, placing additional different colors on the first and second sides of additional posterboards, and selecting a plurality of posterboards so that the plurality of posterboards displays more different color surfaces than the number of posterboards in the plurality.

According to additional aspects of the invention, the inventory of posterboards is a multiple of the selected plurality of posterboards. According to still additional aspects of the invention, additional individual posterboards are added to the plurality of posterboards, the individual added posterboards having displayed colors of anticipated high demand.

The foregoing and other objects and features of the invention will appear in the following description of the preferred embodiments taken together with the drawings.

BRIEF DESCRIPTION OF DRAWINGS

The same reference numerals refer to the same elements throughout the various figures.

DESCRIPTION OF PREFERRED EMBODIMENTS

The invention herein relates to an improved posterboard and a method of reducing inventory utilizing the improved posterboard.

Figure 1:
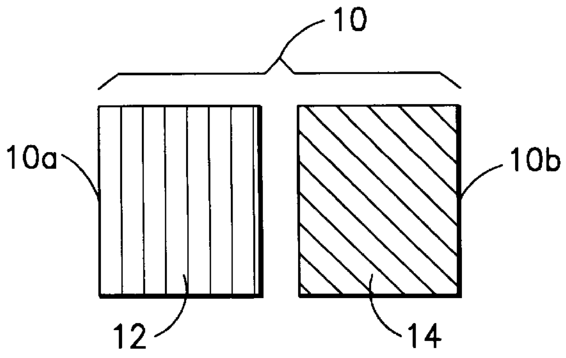
FIG. 1 is a schematic separated view of the two surfaces front and rear of a first posterboard displaying colors according to the invention herein.

FIG. 1 is a schematic view of a posterboard 10 according to the invention. The view is schematic in that the posterboard is separated into two parts 10*a* and 10*b* to show its two planar surfaces 12 and 14. One planar surface 12 displays the color red and is lined for that color in FIG. 1. The other surface 14 displays the color green and is lined for that color in the figure.

The posterboard 10 is made of the usual posterboard stock, which is a heavy paper stock approximately 10 to 13 points thick (0.010–0.013 inches). It is somewhat flexible, for example, it can be rolled without creasing but is stiff enough to be self-supporting, for instance, it can be propped up on an easel without substantial bending or curling, and assumes a relatively flat disposition when hung on the wall.

The posterboard 10 is preferably manufactured by forming and calendaring white posterboard stock. The color is preferably applied by coating techniques, to facilitate the provision of different colors on the opposite surfaces of the posterboard 10. The preferred coating is a pigmented aqueous clay-based coating, applied at approximately 10 pounds per 475,000 square inches. The coating adds approximately one point to the thickness of the posterboard. The color can also be printed onto the posterboard stock, if desired. The posterboard stock is cut into standard 22 x 28 inch sheets.

The consumer may select the posterboard 10 on the basis of its being red or green. If the retailer's stock is low to the point of only having the posterboard 10 remaining, the customer still has two color choices. Also, the consumer may purchase the posterboard 10 without having to make a final decision as to whether the posterboard will be displayed with the color red or the color green facing outwardly, and if the posterboard is hung in an open area, both colors will be displayed. Further, if the posterboard is to be cut into pieces for a smaller display or for lettering, indicia or the like, the consumer can utilize the posterboard 10 to prepare small displays of two different colors, or to prepare letters or other indicia of two different colors.

Figure 2:
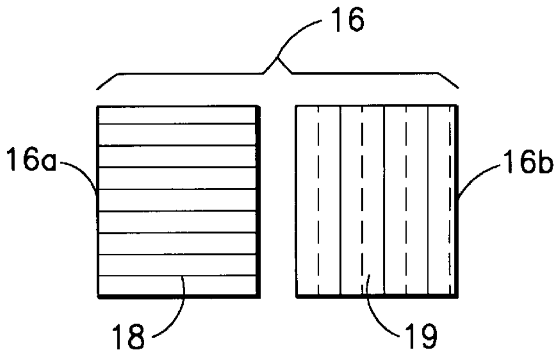
FIG. 2 is a schematic separated view of the two surfaces of a second posterboard displaying colors according to the invention herein, the surfaces displaying different colors than the posterboard FIG. 1.

With reference to FIG. 2, a posterboard 16 according to the invention herein is also shown schematically divided into two parts 16*a* and 16*b*, in order to display its two planar surfaces 18 and 19. The surface 18 is coated to display and displays the color blue, and the surface 19 is coated to display and displays the color pink. The surface 18 is lined for the color blue and the surface 19 is lined for the color pink, the lining for pink being adapted so as not to be duplicative of the lining for red in FIG. 1.

Figure 3:
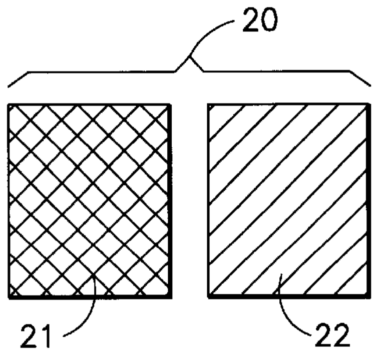
FIG. 3 is a schematic separated view of the two surfaces of a third posterboard displaying colors according to the invention herein, the surfaces displaying colors different than the colors of the posterboards of FIGS. 1 and 2.
Figure 4:
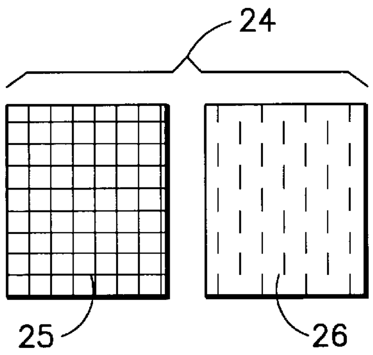
FIG. 4 is a schematic separated view of the two surfaces of a fourth posterboard displaying colors according to the invention herein, the surfaces displaying colors different than the colors of the posterboards of FIGS. 1–3.
Figure 5:
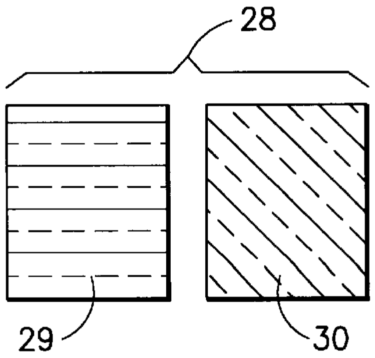
FIG. 5 is a schematic separated view of the two surfaces of a fifth posterboard displaying colors according to the invention herein, the surfaces displaying colors different than the colors of the posterboards of FIGS. 1–4.

FIGS. 3, 4 and 5 illustrate posterboards 20, 24 and 28 in the schematic manner discussed above with respect to FIGS. 1 and 2. Thus, posterboard 20 has surfaces 21 and 22 respectively displaying the colors orange and taupe, and those surfaces are so lined in FIG. 3. Posterboard 24 has surfaces 25 and 26 respectively displaying the colors yellow and lavender, and the surfaces 25, 26 of FIG. 4 are also respectively lined for those colors. Posterboard 28 of FIG. 5 has surfaces 29 and 30 displaying the colors light blue and light green. In FIG. 5, the lining of the colors on the surfaces 29 and 30 has been adapted from the standard linings to indicate that the colors are both “light” and distinguishable from the colors on surfaces 18 and 14 described above.

Figure 6:
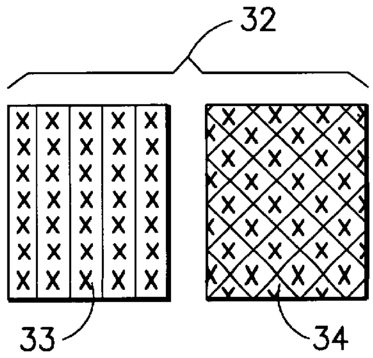
FIG. 6 is a schematic separated view of the two surfaces of a sixth posterboard displaying colors according to the invention herein, the surfaces displaying colors different than the colors of the posterboards of FIGS. 1–5.
Figure 7:
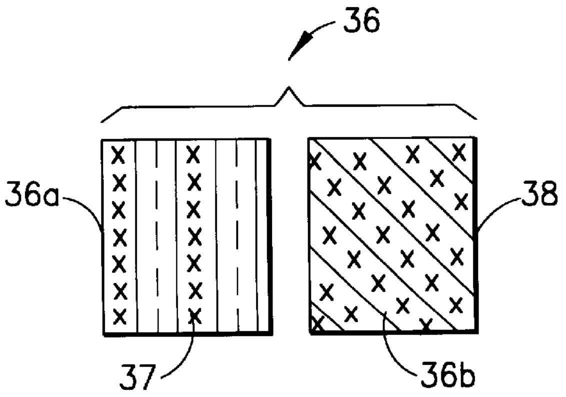
FIG. 7 is a schematic separated view of the two surfaces of a seventh posterboard displaying colors according to the invention herein, the surfaces displaying colors different than the colors of the posterboards of FIGS. 1–6.

FIG. 6 illustrates posterboard 32, also shown schematically in two parts 32*a* and 32*b* with outer surfaces 33 and 34. The posterboard 32 displays fluorescent colors, particularly surface 33 is coated with fluorescent red and surface 34 is coated with fluorescent orange. The linings on surfaces 33 and 34 are adapted from the standard color linings and are intended to indicate fluorescent colors. FIG. 7 illustrates posterboard 36 having surfaces 37 and 38 which also display fluorescent colors namely, fluorescent pink on surface 37 and fluorescent green on surface 38. Again, the are lined for those colors with adaptations of standard linings intended to indicate fluorescents.

Figure 8:
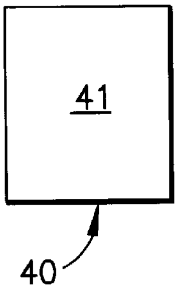
FIG. 8 is a plan view of a posterboard displaying a color different than the colors of the posterboards of FIGS. 1–7.
Figure 9:
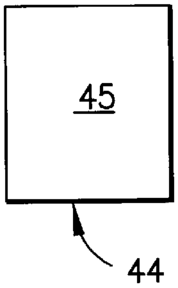
FIG. 9 is a plan view of a posterboard displaying a color different than the colors of the posterboards of FIGS. 1–8.

FIG. 8 illustrates posterboard 40, which is white on both sides including surface 41 seen in the illustration. FIG. 9 illustrates posterboard 44 which is black on both sides, including the surface 45 seen in FIG. 9. It will be appreciated that a white or a black surface could be provided on one of the surfaces of the posterboards described above in FIGS. 1–7, if desired. However, white and black posterboard are popular and therefore may be offered without combining with another color.

Figure 10:
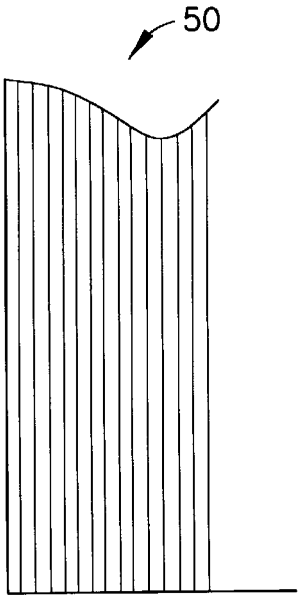
FIG. 10 is a side elevation view of the posterboards of FIGS. 1–9.
Figure 11:
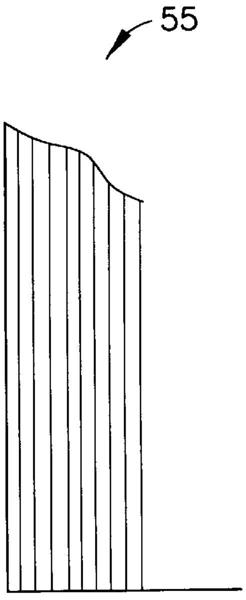
FIG. 11 is a side elevation view of a plurality of posterboards, each posterboard having both surfaces displaying one of the colors displayed by the posterboard of FIGS. 1–10.

As noted above, the posterboards of FIGS. 1–7 having a different color on opposed surfaces have certain benefits to the consumer and user. The improved posterboard also facilitates inventory and stocking by wholesalers and retailers of posterboard. With reference to FIG. 10, there is shown a horizontal stack 50 of individual posterboards each bearing a single color which would be necessary to provide the consumer with a selection of all the colors displayed by the posterboard of FIGS. 1–7 together with the posterboards 40 and 44 of FIGS. 8 and 9. This may be compared to FIG. 11, which shows a stack 55 the posterboards of FIGS. 1–9 in close abutting relationship. From a comparison of FIGS. 10 and 11, it is apparent that more colors can be offered to the consumer in lesser shelf space using the improved posterboard of the invention herein. In the example shown, the full set of colors applied one color per sheet requires sixteen sheets for complete color selection, as compared to nine sheets using the posterboards of FIGS. 1–9.

It will also be appreciated that the color combinations chosen above are, in general, considered to be harmonious. However, it is also contemplated by the invention that the color combinations can be selected to minimize inventory. For example, a color which has low sales volume may be combined with a color that has high sales volume, so that the retailer has both an adequate stock of the high demand color and availability of the low demand color. Similarly, the low volume color may be applied to only a portion of the opposite sides of the popular color with the remaining opposite sides of the high volume color being devoted to either other low volume colors or to other high volume colors. Overall, the effect is to offer the consumer the widest choice based on the smallest amount of inventory and display space.

It is particularly contemplated that the posterboards be displayed initially in a group having all colors, and that the group be augmented by additional posterboards with popular colors. Large volume retailers would display multiples of the color group.

Accordingly, the improved posterboard and methods of reducing inventory in posterboards described above admirably fulfill the objects of the invention herein. It will be appreciated that various changes may be made by those skilled in the art without departing from the spirit and scope of the invention, which is limited only by the following claims.

I claim:

1. A posterboard consisting of:

A) a rectangular sheet of paperboard stock having a thickness in the range of approximately 10 points to 20 points and first and second planar surfaces;

B) substantially the entire first surface having a first pigmented coating applied thereon, the first pigmented coating having only a first single solid color; and C) substantially the entire second surface having a second pigmented coating thereon, the second smooth pigmented coating having only a second, different single solid color, whereby the posterboard may be maintained in inventory, selected for purchase and used on the basis of either or both single solid colors.

2. A posterboard as defined in claim 1, wherein at least one of the colors is fluorescent.

3. A posterboard as defined in claim 2, wherein both the first and second colors are fluorescent.

4. A display of a plurality of posterboards provided for sale to consumers primarily as individual ones of the plurality of posterboards, at least some of the plurality of posterboards each consisting of a rectangular sheet of paperboard stock having a thickness in the range of approximately 10 points to 20 points and two planar surfaces with a first pigmented coating of a first single solid color applied on substantially one entire planar surface thereof and a second pigmented coating of a second single solid color applied on substantially the other entire planar surface thereof, whereby the posterboard displays a combination of two different single solid colors respectively deployed one each on its two planar surfaces, at least some of the plurality of posterboards having planar surfaces displaying a single solid color different from the single solid color displayed by the planar surfaces of others of the plurality of posterboards, and at least some of the plurality of posterboards having first and second planar surfaces displaying a different combination of two different single solid colors than the combination of two different single solid colors displayed by another of the posterboards, whereby a consumer may select an individual posterboard on the basis of the single solid color displayed on either of the two planar surfaces thereof or on the basis of the combination of single solid colors displayed on the two planar surfaces thereof.

5. A plurality of posterboards as defined in claim 4, wherein at least some of the colors are fluorescent.

6. A plurality of posterboards as defined in claim 4, wherein the plurality of posterboards is augmented by additional posterboards displaying colors duplicating some of the colors of the plurality.

7. A method of reducing inventory and display space of posterboard comprising the steps of:

A) obtaining a plurality of posterboards each consisting of posterboard stock having a thickness in the range of approximately 10 points to 20 points and two planar surface with a coating of a first single color applied on one planar surface and a coating of second single color applied on the second surface thereof, with a least some of the plurality of posterboards having surfaces displaying single colors different from others of the plurality of posterboards; and B) selecting and displaying a plurality of posterboards displaying more single colors than the number of posterboards in the plurality.

8. The method of inventory and shelf display space reduction as defined in claim 7, wherein the total inventory is a multiple of the plurality of the posterboards.

9. The method of inventory reduction and display space reduction defined in claim 7, wherein the total inventory displayed is multiple of the plurality.

10. The method of inventory and display space reduction as defined in claim 7, wherein the inventory includes individual posterboards added to the plurality according to anticipated demand.

* * * * *